(12) United States Patent
Godbold et al.

(10) Patent No.: US 8,130,478 B2
(45) Date of Patent: Mar. 6, 2012

(54) POWER LIMITING SYSTEM FOR MULTIPLE ELECTRIC MOTORS

(75) Inventors: Clement Vanden Godbold, Rock Hill, SC (US); Patrick Wilson Cross, Charlotte, NC (US)

(73) Assignee: Deere & Company, Moline, IL (US)

( * ) Notice: Subject to any disclaimer, the term of this patent is extended or adjusted under 35 U.S.C. 154(b) by 518 days.

(21) Appl. No.: 12/419,612

(22) Filed: Apr. 7, 2009

(65) Prior Publication Data

US 2010/0253271 A1  Oct. 7, 2010

(51) Int. Cl.
*H02P 7/09* (2006.01)

(52) U.S. Cl. ............ 361/33; 318/34; 318/5; 318/8; 318/68; 318/41; 318/49; 318/53; 318/59; 318/64; 318/101; 361/86; 361/21; 361/6; 361/18; 361/56; 361/23

(58) Field of Classification Search .......... 318/5, 8, 318/68, 41, 34, 49, 53, 59, 64, 66, 69, 101, 318/88, 99, 98; 307/55, 53; 361/33, 86, 361/21, 6, 18, 56, 23
See application file for complete search history.

(56) References Cited

U.S. PATENT DOCUMENTS

| | | | |
|---|---|---|---|
| 3,771,821 A | 11/1973 | Rist et al. | |
| 4,306,402 A | 12/1981 | Whimp | |
| 4,363,999 A * | 12/1982 | Preikschat | 318/53 |
| 4,736,367 A * | 4/1988 | Wroblewski et al. | 340/3.51 |
| 4,899,338 A * | 2/1990 | Wroblewski | 370/276 |
| 5,345,155 A * | 9/1994 | Masaki et al. | 318/400.07 |
| 5,363,039 A * | 11/1994 | Kumar et al. | 324/764.01 |
| 5,540,037 A | 7/1996 | Lamb et al. | |
| 5,934,051 A | 8/1999 | Hahn | |
| 6,078,173 A * | 6/2000 | Kumar et al. | 324/765.01 |
| 6,082,084 A | 7/2000 | Reimers et al. | |
| 6,639,331 B2 * | 10/2003 | Schultz | 307/84 |
| 6,856,035 B2 * | 2/2005 | Brandon et al. | 290/40 C |
| 6,948,299 B2 | 9/2005 | Osborne | |
| 6,949,898 B2 | 9/2005 | Inui et al. | |
| 7,007,446 B2 | 3/2006 | Dettmann | |
| 7,134,261 B2 | 11/2006 | Inui et al. | |

FOREIGN PATENT DOCUMENTS

| | | |
|---|---|---|
| EP | 1813463 | 8/2007 |
| EP | 1832483 | 9/2007 |
| WO | 9630992 | 10/1996 |
| WO | 2006086412 | 8/2006 |

OTHER PUBLICATIONS

W. Swiegers and J.Enslin. An Integrated Maximum Power Point Tracker for Photovoltaic Panels. 1998 IEEE, pp. 40-44. [Downloaded from IEEE Xplore on Apr. 1, 2009].

* cited by examiner

*Primary Examiner* — Rita Leykin

(57) ABSTRACT

A power limiting system for multiple electric motors includes an electrical power generating component, such as an alternator, and a plurality of motor controllers connected to an electrical bus. Each motor controller compares the voltage on the bus to a specified minimum voltage and a specified maximum voltage, and reduces its electric power output if the voltage on the bus is less than the maximum voltage while continuing to operate the electric motors.

14 Claims, 4 Drawing Sheets

Example of Power Limit Curve

POWER LIMITING SYSTEM FOR MULTIPLE ELECTRIC MOTORS

FIELD OF THE INVENTION

This invention relates to a power limiting system, and more specifically to a system for limiting electrical power for multiple electric motors that turn cutting reels or similar implements on a grass mowing machine.

BACKGROUND OF THE INVENTION

Electric motors are increasingly used on grass mowing machines for rotating cutting reels or other similar implements. On grass mowing machines, for example, power for multiple electric motors may be generated with a Lundell alternator that is belt driven by an internal combustion engine. A Lundell alternator can supply current under constant voltage conditions to an upper limit, depending on several factors including temperature. Above the upper limit, current can increase slightly, but voltage collapses sharply as the machine transforms from behaving as a voltage source to behaving as a current source. For example, an alternator that can supply 175 Amps at 48 Volts DC, can only support 35 Volts DC at 190 Amps. As a result, if current demand by the electric motors is very high, approaching or exceeding the capacity of the power generating component, the electrical power may be significantly lower due to a sharp voltage drop. Once the voltage drops too far, it can be insufficient to power other electrical functions on the machine, resulting in a condition commonly referred to as "brownout." Other power generating devices such as permanent magnet alternators, electrochemical batteries, DC machines, and others suffer from overload problems of a type similar to the above. For example, electrochemical cells will undergo voltage collapse under high load conditions, particularly when the battery is highly discharged.

One condition demanding high current is start-up of multiple electric motors. For example, electric motors may have control systems that demand high current to start each reel spinning. The motors may be provided with control systems that typically include speed set points in the range of 2000 rpm to 3000 rpm. During start up, there is a large difference between actual reel speed and the set point, resulting in a proportional gain term that requires high current. The high current demand, especially during start-up of multiple electric motors that turn cutting reels, may exceed the capacity of the power generating component. As a result, a brownout condition may occur.

Another condition where high current is demanded is high frictional resistance. For example, multiple electric motors may demand high current if the cutting reels have high friction because of reel-to-bedknife interference or insufficient reel-to-bedknife clearance. Cutting reels that are rotated without a relief grind, or with interference, or less than the specified clearance ($2\times10^{-3}$ inches, for example), produce friction at the interface that heats both surfaces, causing both to expand and exacerbate the interference. The thermal expansion causes the current to increase. If there is enough interference between the reel and bedknife, the electric motors may eventually draw so much current that the voltage collapses. The result may be a brownout condition, in addition to possibly shutting down all of the cutting reels in the system.

A third condition that demands high current is excessive load. For example, a grass mowing machine may be subject to an excessive load when performing operations such as verticutting, or due to inadvertently scalping the turf or ground surface. These situations require high current that may brownout the alternator and shut down the electrical system.

It is desirable to operate multiple electric motors without losing functionality during start up, while encountering high friction, or when the motors are subject to high or excessive loads. It is desirable to operate multiple electric motors while maintaining bus voltage above a specified threshold. It is desirable to provide adequate power to multiple electrical motors without brownouts using power generated from a Lundell alternator, battery, or other electric power generating component.

SUMMARY OF THE INVENTION

The present invention provides a power limiting system for operating multiple electric motors with power from a Lundell alternator, battery, or other electric power generating component without losing functionality during start up, while encountering high friction, or during high loads. The power limiting system operates multiple electric motors while maintaining bus voltage above a specified threshold, and provides adequate power to the motors without brownouts. Power delivered from the generating source is maximized by modulating the load from the motors and preventing any collapse if the load increases.

The power limiting system monitors bus voltage and reduces the electric current (and hence power demand) to the electric motors if the bus voltage becomes too low. Dynamically adjusting power demand based on bus voltage maintains the bus voltage, which maximizes the available power. The system may be used on a grass mowing machine with multiple electric motors that power grass cutting reels, or other electrically powered implements.

DESCRIPTION OF THE PREFERRED EMBODIMENT

Figure 1:
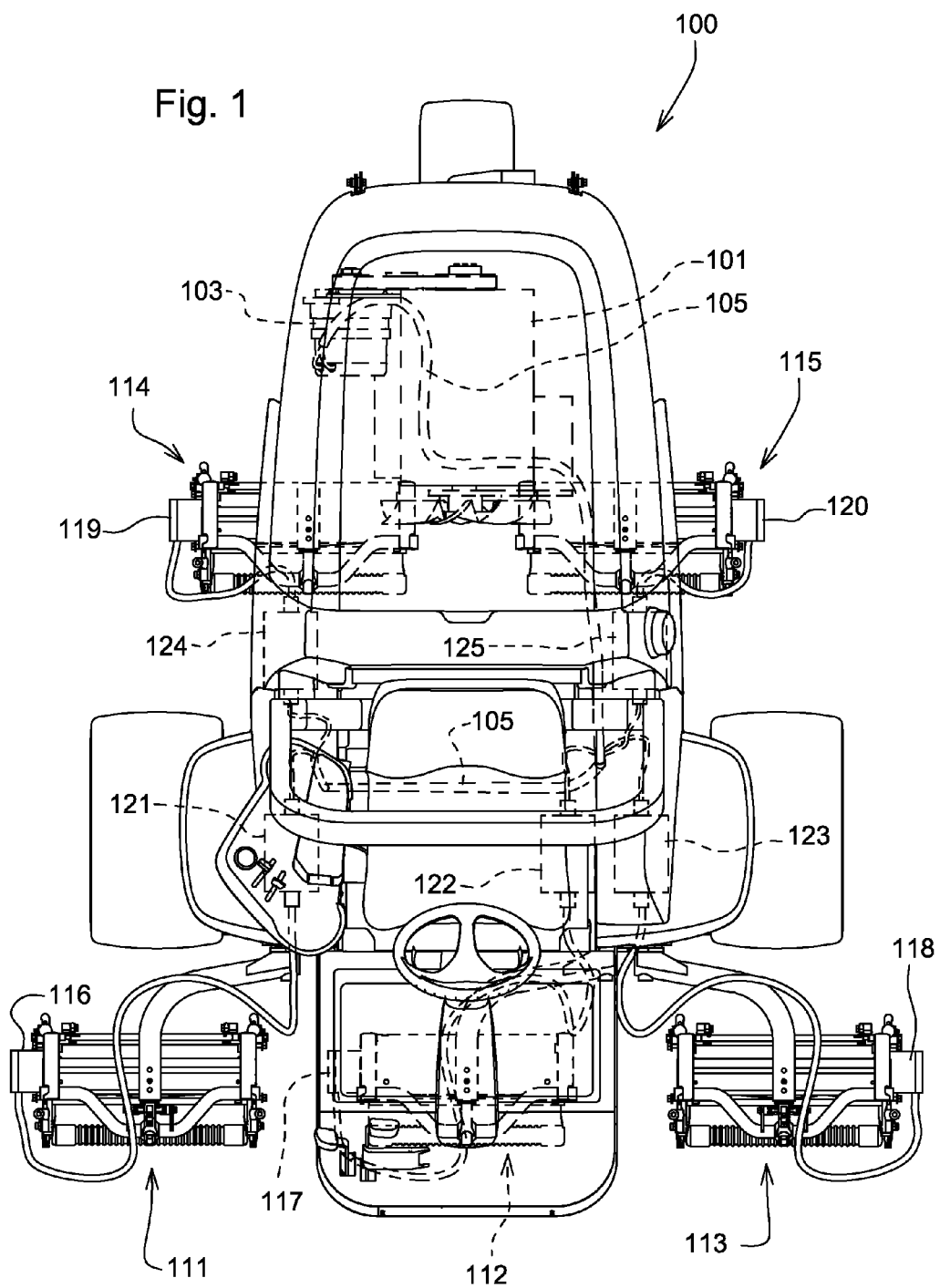
FIG. 1 is a perspective view of a grass mowing machine with a power limiting system for multiple electric motors according to a first embodiment of the invention.
Figure 2:
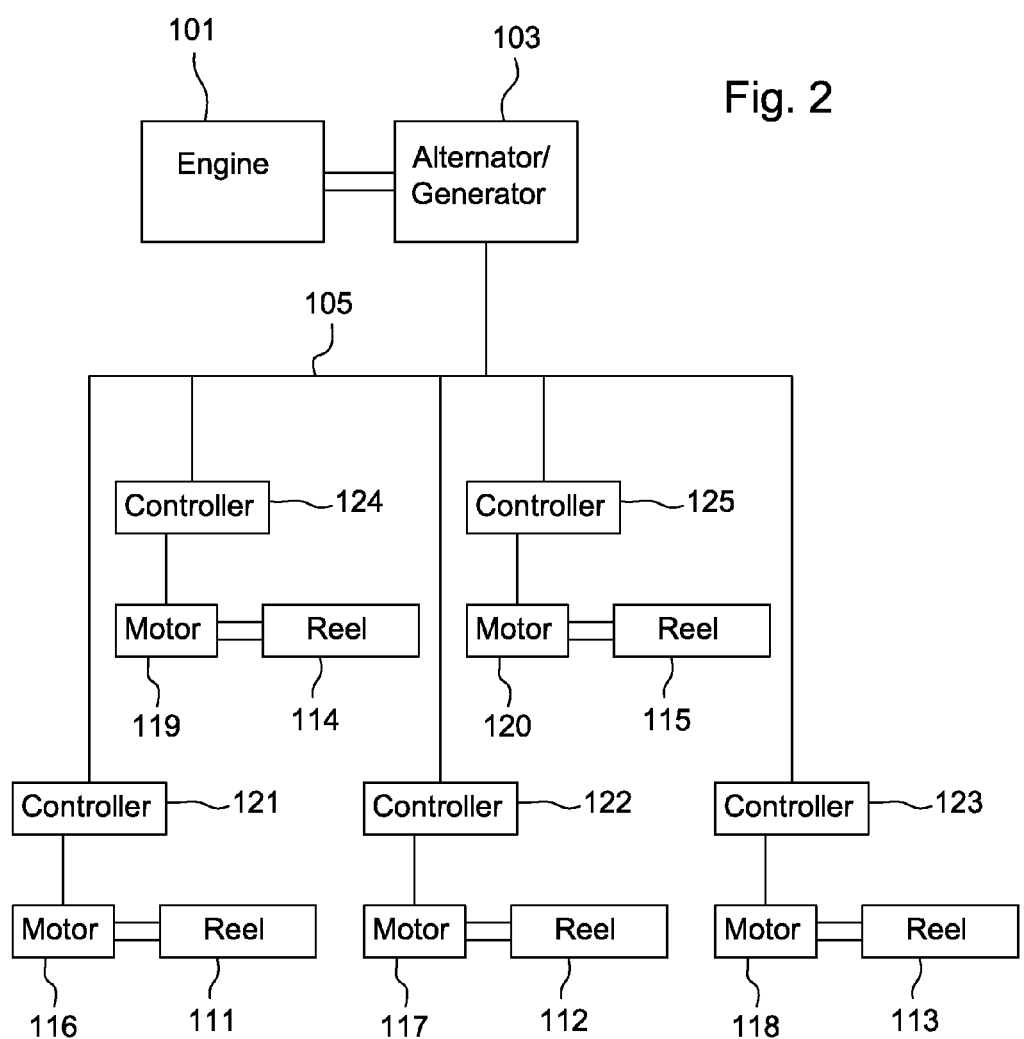
FIG. 2 is a block diagram of a power limiting system for multiple electric motors according to a first embodiment of the invention

FIGS. 1 and 2 show embodiments of a power limiting system to maintain bus voltage for multiple electric motors. For example, the power limiting system may be used on a grass mowing machine, such as golf course fairway mower 100 with an internal combustion engine 101 or other power supply, that turns an electrical power generating source, such as a belt-driven Lundell alternator 103. The power limiting system also may be used in machines having electrical power from batteries or other electrical power generating components. The alternator, battery, or other electric power generating component may be electrically connected to electrical bus 105 to a plurality of electric motors 116-120, each electric motor provided with a motor controller 121-125 and rotating a reel cutting unit 111-115 or similar implement The logic shown in the flow diagram of FIG. 3 may be programmed and implemented in software or hardware in the motor controllers 121-125. The logic of the power limiting system reduces power demand on the alternator, battery or other electric power generating component if bus voltage drops below a specified voltage. The purpose of dynamically reducing power demand is to limit the total load from multiple electric motors to be less than or equal to the maximum power generating capacity. Preventing overload (and hence bus voltage collapse) maximizes available power. The power limiting system can detect overload of the alternator, battery, or other power generating component independently of the speed or load on the internal combustion engine.

In one embodiment, the power consumed by the individual motor controller can be calculated from the current and voltage at each output terminal of the motor controller as follows $$p = \sum_{j=1}^{n} v_j i_j$$

where
p=motor controller output power
n=total number of motor phases
j=index of summation
$i_j$=phase current on phase j
$v_j$=phase voltage on phase j The power specified above will not be exactly the same as the input power to the motor controller, due to inefficiencies in the controller, but is sufficiently close for the power limiting system of the present invention. The reason to use output power of the motor controller is that the output voltage and current are often known, so it is more convenient to calculate power using these variables. Input power also could be measured or calculated more accurately by using an efficiency term.

Figure 4:
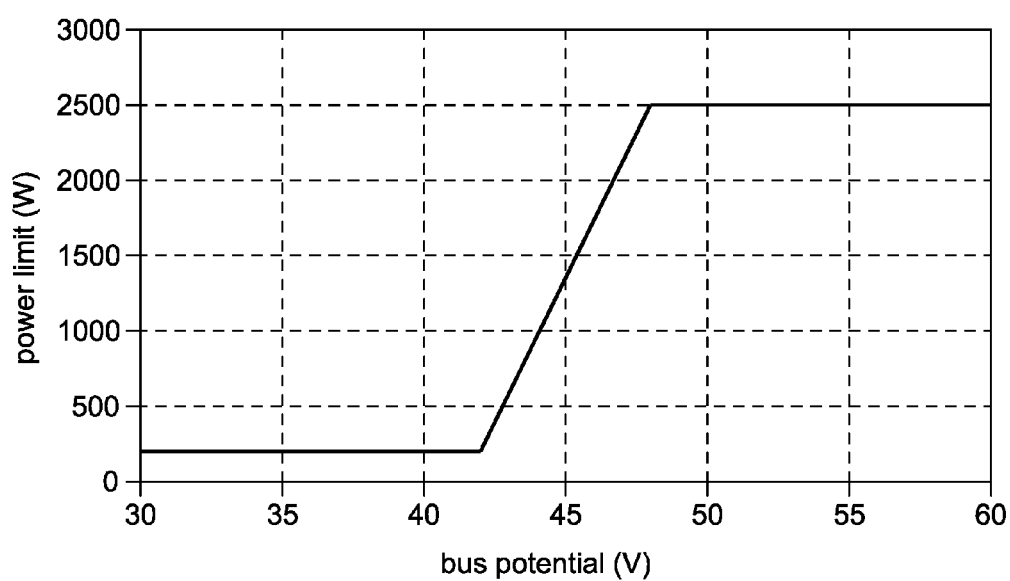
FIG. 4 is an example of a power limit curve as a function of bus voltage according to one embodiment of the invention.

In one embodiment, each motor controller may use a table such as FIG. 4, which provides an example of a limit function for the output power at a range of bus voltages. For example, if the bus voltage is 48 volts, the power limit may be 2500 watts, while if the bus voltage drops to 45 volts, the power limit may be down to about 1400 watts. Each motor controller may determine the power limit from a table (at some rate that is faster than the time constant of the power generation system), and then generate a maximum current limit $i_{limit}$. The power limiting system sets the magnitude of the resultant motor current vector $I_{max}$ as less than or equal to the current limit $i_{limit}$.

In one embodiment, the power limiting system may use three-phase square drive control (where current goes into one phase and out another phase, with the third phase held open, except during commutation), the current limit may be calculated using the applied line-to-line voltage and the power limit as follows:

$$i_{limit} = p/V_{line\text{-}to\text{-}line} = p/DV_{bus}$$

where $i_{limit}$ is the calculated current limit;
$V_{line\text{-}to\text{-}line}$ is the potential difference between the two active phases;
D is the duty cycle of the pulse width modulated voltage signal applied to the phases; and
$V_{bus}$ is the potential of the bus that is alternately applied to the two active phases according to the duty cycle, D.

In the embodiment using three-phase square drive control, $DV_{bus}$ may be an instantaneous measure just before the current limit calculation. If the current demand at the existing speed ($DV_{bus}$ is an indicator of speed) is higher than the current limit determined using the above calculation, the electric motors will tend to slow down because the inverter will ramp back the duty cycle to bring the current in line.

In an alternative embodiment, the power limiting system may use balanced sinusoidal field oriented control, in which the current limit may be calculated using the following equations:

$$p = \sum_{j=1}^{n} v_j i_j = nV_{rms}I_{rms} = \frac{n}{2}V_{max}I_{max}$$

$$I_{max} = i_{limit} = \frac{2}{n}\frac{p}{V_{max}}$$

where:
$V_{rms}$ is the root-mean-square value of the applied line-to-neutral voltage;
$I_{rms}$ is the root-mean-square value of the applied line current;
$V_{max}$ is the peak value of the applied line-to-neutral voltage sinusoid; and
$I_{max}$ is the peak value of the applied line-to-neutral current sinusoid.

In one embodiment, each motor controller in the power limiting system may reduce output power to each electric motor before the bus voltage declines below an acceptable operating range. For example, in FIG. 4, the power limiting system may reduce output power before the bus voltage drops below 42 volts. If the controller reduces the output power, the electrical motors will turn at a lower speed for a given load. By limiting the output power to the load motors, input power to the controllers may be limited in a linear fashion based on bus voltage decline, as described in more detail below.

Additionally, in one embodiment, the power limiting system may monitor bus voltage at start up and each motor controller may output a signal when the voltage reaches a minimum voltage that is sufficient to allow the motor to start. For example, at start up, motor controllers 121-125 may start motors 116-120 once the bus voltage reaches 42 volts.

Figure 3:
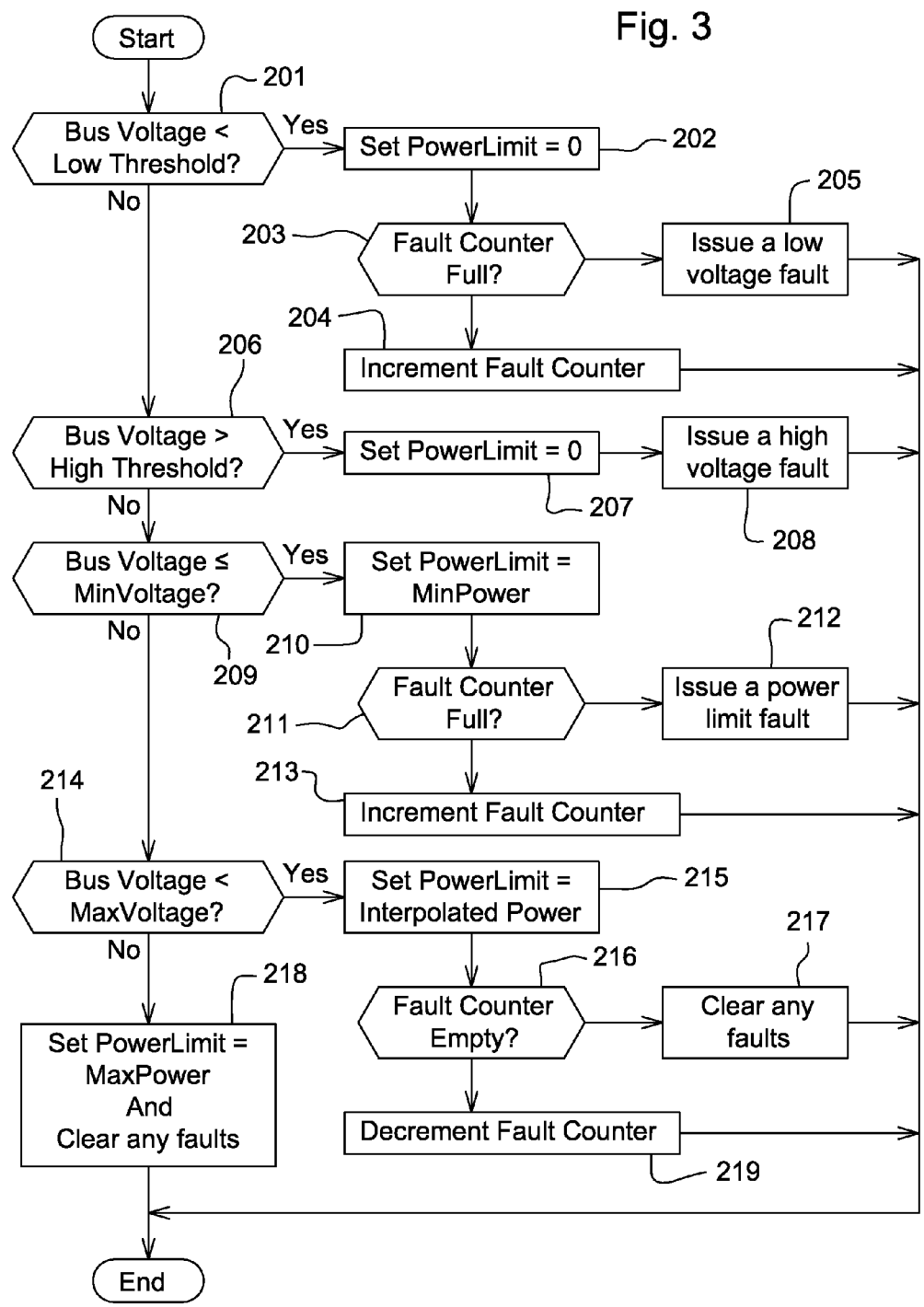
FIG. 3 is a logic flow diagram of a power limiting system for multiple electric motors according to a first embodiment of the invention.

In the embodiment of FIG. 3, each motor controller monitors the bus voltage ($V_{bus}$) on a grass mowing machine having multiple electric motors, preferably at a sample period such as 1 ms, based on a time constant of the alternator of 10 ms.

In block 201, the bus voltage is compared to an extremely low fault threshold value. If the bus voltage is less than the low fault threshold, in block 202 the power limit is set to zero or a nominal value insufficient for motor operation. In block 203, it is determined if the fault counter is full. If it is not full, in block 204 the fault counter is incremented. If it is full, in block 205 a low voltage fault is issued.

If the bus voltage is not less than the low threshold, in block 206 it is compared to an extremely high fault threshold value. If the bus voltage is greater than the high threshold, in block 207 the power limit is set to zero or a nominal value insufficient for motor operation, and in block 208, a high voltage fault is issued.

If the bus voltage is not greater than the high threshold, in block 209 it is compared to a preset minimum bus voltage value ($V_{bus\_min}$) which is below the normal operating range. If the bus voltage is less than or equal to the minimum voltage, in block 210 the power limit is set at a preset minimum power value ($p_{min}$). In the example of FIG. 4, the minimum bus voltage is 42 volts, and the minimum power value is 200 watts. This may be the minimum bus voltage for power sufficient to continue operation of all reel motors. The minimum voltage is chosen to be above the voltage level where the alternator power output decreases significantly. Additionally, in block 211 it is determined if the fault counter is full. If it is not full, in block 213 the fault counter is incremented. If it is full, in block 212 a power limit fault is issued.

If the bus voltage is not less than or equal to the minimum voltage, in block 214 the bus voltage is compared to a maximum bus voltage value, ($V_{bus\_max}$). The maximum voltage may be set at 48 volts, as shown in FIG. 4, for example, which is the voltage output of the alternator, battery, or other electrical power generating component. In the case of a regulated Lundell alternator, the regulator attempts to maintain this voltage or slightly higher. If the bus voltage is less than the maximum bus voltage (but greater than the minimum bus voltage), in block 215 the power limit is set at an interpolated output power limit (Pout) as follows:

$$p_{out} = [[[p_{max} - p_{min}]/[V_{bus\_max} - V_{bus\_min}]] \times [V_{bus} - V_{bus\_min}]] + p_{min}$$

Where:
$p_{out}$=Power limit
$p_{min}$=Minimum Power
$p_{max}$=Maximum Power
$V_{bus\_min}$=Minimum Bus Voltage
$V_{bus\_max}$=Maximum Bus Voltage
$V_{bus}$=Bus Voltage (Filtered)

Additionally, in block 216 it is determined if the fault counter is empty. If it is empty, in block 217 any faults are cleared. If it is not empty, in block 219 the fault counter is decremented by one.

If the bus voltage is not less than the maximum voltage, in block 218 the power limit is set at the maximum power ($p_{max}$) and any faults are cleared. The maximum power value may be set at 2500 watts, for example, as shown in FIG. 4.

Having described the preferred embodiment, it will become apparent that various modifications can be made without departing from the scope of the invention as defined in the accompanying claims.

The invention claimed is:

1. A power limiting system for multiple electric motors, comprising:
    an electrical power generating component connected to and providing a voltage on an electrical bus;
    a plurality of motor controllers connected to the bus, each motor controller providing an electric power output to a separate electric motor;
    each motor controller comparing the voltage on the bus to a specified minimum voltage and a specified maximum voltage, and reducing its electric power output if the voltage on the bus is between the specified minimum and maximum voltages while the motors are operating.

2. The power limiting system of claim 1 wherein the electrical power generating component is a Lundell alternator.

3. The power limiting system of claim 1 wherein each motor controller limits its electric power output in relation to how much the voltage on the bus is under the maximum voltage.

4. The power limiting system of claim 1 wherein each of the multiple electric reel motors rotates a cutting reel.

5. The power limiting system of claim 1 wherein the motor controllers stop operation of the electric motors if the voltage on the bus is under the minimum voltage.

6. A method for limiting power for multiple electric motors, comprising:
    generating a voltage on an electrical bus connected to multiple motor controllers having electrical power output to the multiple electric motors;
    monitoring the voltage on the bus; and
    reducing the electrical power output of the motor controllers if the voltage monitored on the bus is between a minimum voltage and a maximum voltage while the multiple electric motors are operating.

7. The method of claim 6 further comprising stopping operation of the multiple electric motors if the voltage monitored on the bus is below the minimum voltage.

8. The method of claim 6 further comprising reducing the electrical power output proportionately to how far the voltage on the bus is below the maximum voltage.

9. The method of claim 6 further comprising delaying operation of the multiple electric motors until the voltage monitored on the bus exceeds the minimum voltage.

10. The method of claim 6 further comprising rotating multiple cutting reels with the multiple electric motors.

11. A power limiting system for multiple electric motors, comprising:
    an electric power generating component connected to a plurality of motor controllers on an electrical bus; each motor controller having a power output for an electrical motor;
    each motor controller monitoring a voltage on the bus, determining if the voltage on the bus is below a specified maximum voltage, calculating a power limit if the voltage is below the specified maximum voltage, and reducing the power output of the motor controller to the reduced power limit.

12. The power limiting system of claim 11 wherein the controller determines if the voltage on the bus is above a specified minimum voltage.

13. The power limiting system of claim 12 wherein each motor controller delays start up of an electric motor until the voltage on the bus is above the specified minimum voltage.

14. The power limiting system of claim 11 wherein the electric power generating component is a Lundell alternator.

* * * * *